United States Patent
Sato

(10) Patent No.: US 12,430,121 B2
(45) Date of Patent: Sep. 30, 2025

(54) CONTROL DEVICE AND MANAGEMENT METHOD

(71) Applicant: TOYOTA JIDOSHA KABUSHIKI KAISHA, Toyota (JP)

(72) Inventor: Fumiya Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 17/982,700

(22) Filed: Nov. 8, 2022

(65) Prior Publication Data

US 2023/0185564 A1 Jun. 15, 2023

(30) Foreign Application Priority Data

Dec. 13, 2021 (JP) ................................. 2021-201706

(51) Int. Cl.
*G06F 8/654* (2018.01)
*G06F 3/06* (2006.01)

(52) U.S. Cl.
CPC ............ *G06F 8/654* (2018.02); *G06F 3/0604* (2013.01); *G06F 3/0647* (2013.01); *G06F 3/0679* (2013.01)

(58) Field of Classification Search
CPC .... G06F 3/0606; G06F 3/0647; G06F 3/0679; G06F 8/60–66; G06F 11/1433
USPC ................................................. 717/168–178
See application file for complete search history.

(56) References Cited

U.S. PATENT DOCUMENTS

| 11,816,473 | B2* | 11/2023 | Goto ......................... G06F 8/65 |
| 2018/0189049 | A1* | 7/2018 | Madrid ...................... G06F 8/65 |
| 2020/0372157 | A1* | 11/2020 | Singer ................. G06F 11/0793 |
| 2021/0255805 | A1* | 8/2021 | Harata .................. H04L 12/403 |

FOREIGN PATENT DOCUMENTS

| JP | 2000-207681 A | 7/2000 |
| JP | 2002-207599 A | 7/2002 |
| JP | 2014-029619 A | 2/2014 |
| JP | 2018-018186 A | 2/2018 |
| JP | 2021-005148 A | 1/2021 |

OTHER PUBLICATIONS

Kim, Do Yeon, et al., Writing Reprogramming Data from RAM to Flash Memory Using Multicore Electronic Control Units, 15th International Conference on Ubiquitous Information Management and Communication (IMCOM), Jan. 2021, 4 pages, [retrieved on May 20, 2025], Retrieved from the Internet: <URL:http://ieeexplore.ieee/>.*

* cited by examiner

*Primary Examiner* — Geoffrey R St Leger
(74) *Attorney, Agent, or Firm* — Dinsmore & Shohl LLP

(57) ABSTRACT

The control device of the vehicle comprises a first non-volatile memory storing software for controlling the vehicle and one or more processors executing the software. The one or more processors determine whether the old software before the update is stored in the second non-volatile memory mounted in the vehicle when the software needs to be returned to the old software before the update, and store the old software from the second non-volatile memory to the first non-volatile memory when the old software is stored in the second non-volatile memory.

11 Claims, 10 Drawing Sheets

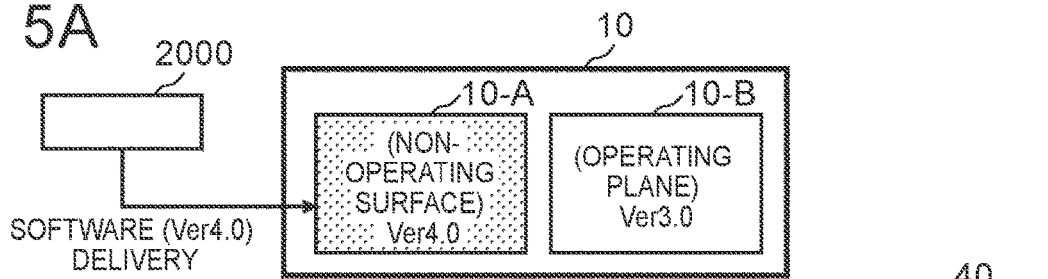
FIG. 5A
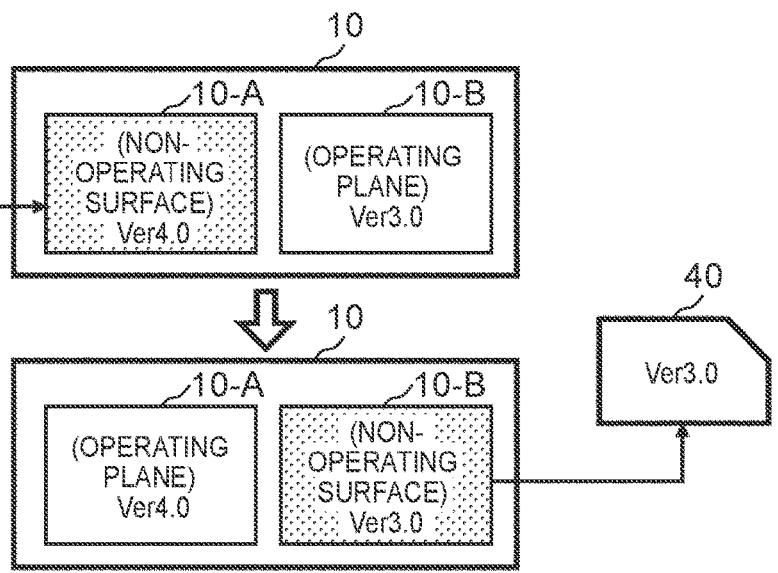
FIG. 5B
FIG. 5C
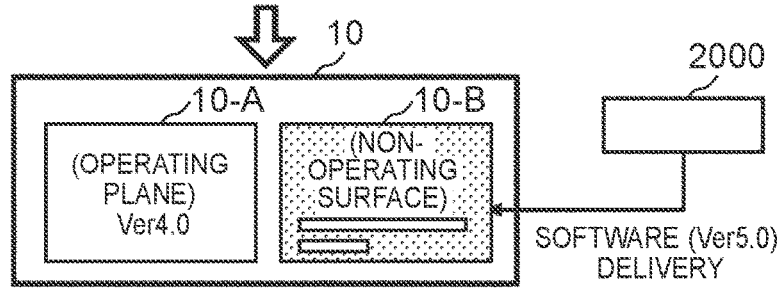
FIG. 5D
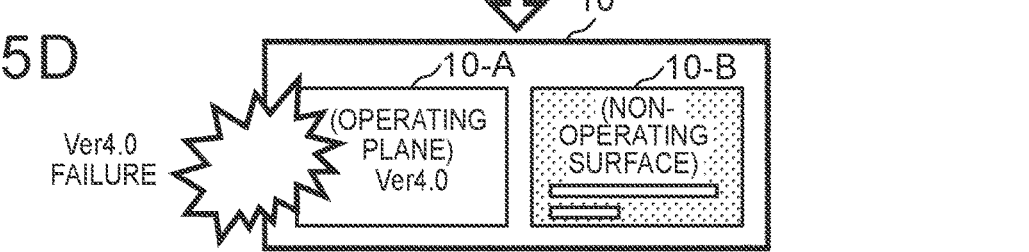
FIG. 5E
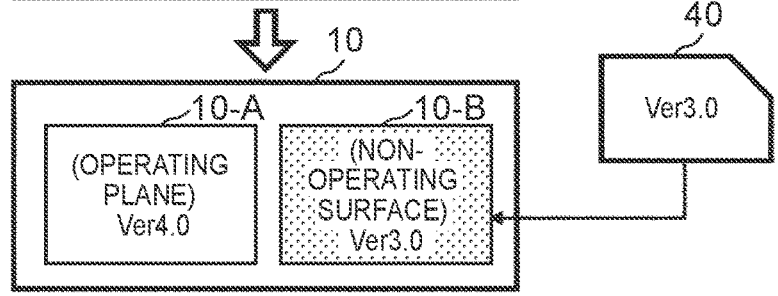
FIG. 5F
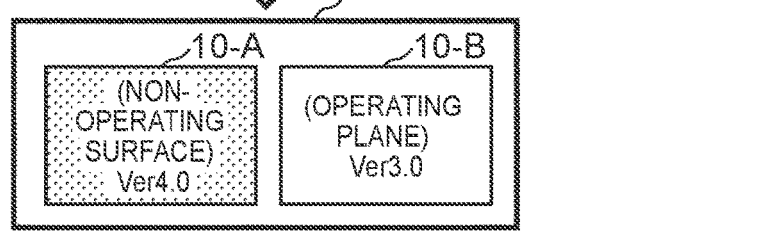

CONTROL DEVICE AND MANAGEMENT METHOD

CROSS-REFERENCE TO RELATED APPLICATION

This application claims priority to Japanese Patent Application No. 2021-201706 filed on Dec. 13, 2021, incorporated herein by reference in its entirety.

BACKGROUND

1. Technical Field

The present disclosure relates to a control device for a vehicle and a method for managing the control device.

2. Description of Related Art

Japanese Unexamined Patent Application Publication No. 2014-029619 (JP 2014-029619 A) discloses a control system and a program updating method for safely recovering a program of a control device that performs a control process based on a computer program, in a case where updating of the program fails. In a system in which a plurality of control devices is connected, when updating a program of a target control device, program information before the update is temporarily saved in another control device. When the update of the program in the control device to be updated fails, the program can be restored by writing back the saved program.

SUMMARY

The control device of the vehicle performs a control process based on software such as a computer program. The software may be updated to new software to add functionality, improve convenience, etc. The update of the software may fail if a communication interruption or the like occurs, and JP 2014-029619 A discloses a technique that enables recovery even when the update of the software fails. However, even after the update of the software is successfully completed, there may be a case where a defect is found in the software itself after the update and a countermeasure is required.

The present disclosure provides a technique capable of appropriately dealing with a defect in a control device of a vehicle when the defect is found in updated software.

A first aspect relates to a control device for a vehicle. A control device for a vehicle includes: a first non-volatile memory that stores software for controlling the vehicle; and one or more processors that execute the software. The one or more processors determine whether an old software before an update is stored in a second non-volatile memory mounted on the vehicle, when the software needs to be returned to the old software before the update, and move the old software from the second non-volatile memory to the first non-volatile memory to store the old software in the first non-volatile memory when the old software is stored in the second non-volatile memory.

A second aspect relates to a method for managing a control device. A control device is mounted on a vehicle and includes a first non-volatile memory that stores software for controlling the vehicle. The method includes: determining whether an old software before an update is stored in a second non-volatile memory mounted on the vehicle, when the software needs to be returned to the old software before the update; and moving the old software from the second non-volatile memory to the first non-volatile memory to store the old software in the first non-volatile memory when the old software is stored in the second non-volatile memory.

The present disclosure allows appropriately dealing with a defect in a control device of a vehicle when the defect is found in updated software.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a conceptual diagram for explaining a first example of a process related to rollback according to the present embodiment;

FIG. 5B is a conceptual diagram for explaining a first example of a process related to rollback according to the present embodiment;

FIG. 5C is a conceptual diagram for explaining a first example of a process related to rollback according to the present embodiment;

FIG. 5D is a conceptual diagram for explaining a first example of a process related to rollback according to the present embodiment;

FIG. 5E is a conceptual diagram for explaining a first example of a process related to rollback according to the present embodiment;

FIG. 5F is a conceptual diagram for explaining a first example of a process related to rollback according to the present embodiment;

DETAILED DESCRIPTION OF EMBODIMENTS

Embodiments of the present disclosure will be described with reference to the accompanying drawings.

1. OVERVIEW

The control device according to the present embodiment is a control device for a vehicle. The control device includes a memory and a processor, and controls the vehicle by executing software stored in the memory by the processor. Electronic Control Unit (ECUs) are typical control devices for vehicles. The vehicle including the ECU is configured as shown in FIG. 1, for example.

Figure 1:
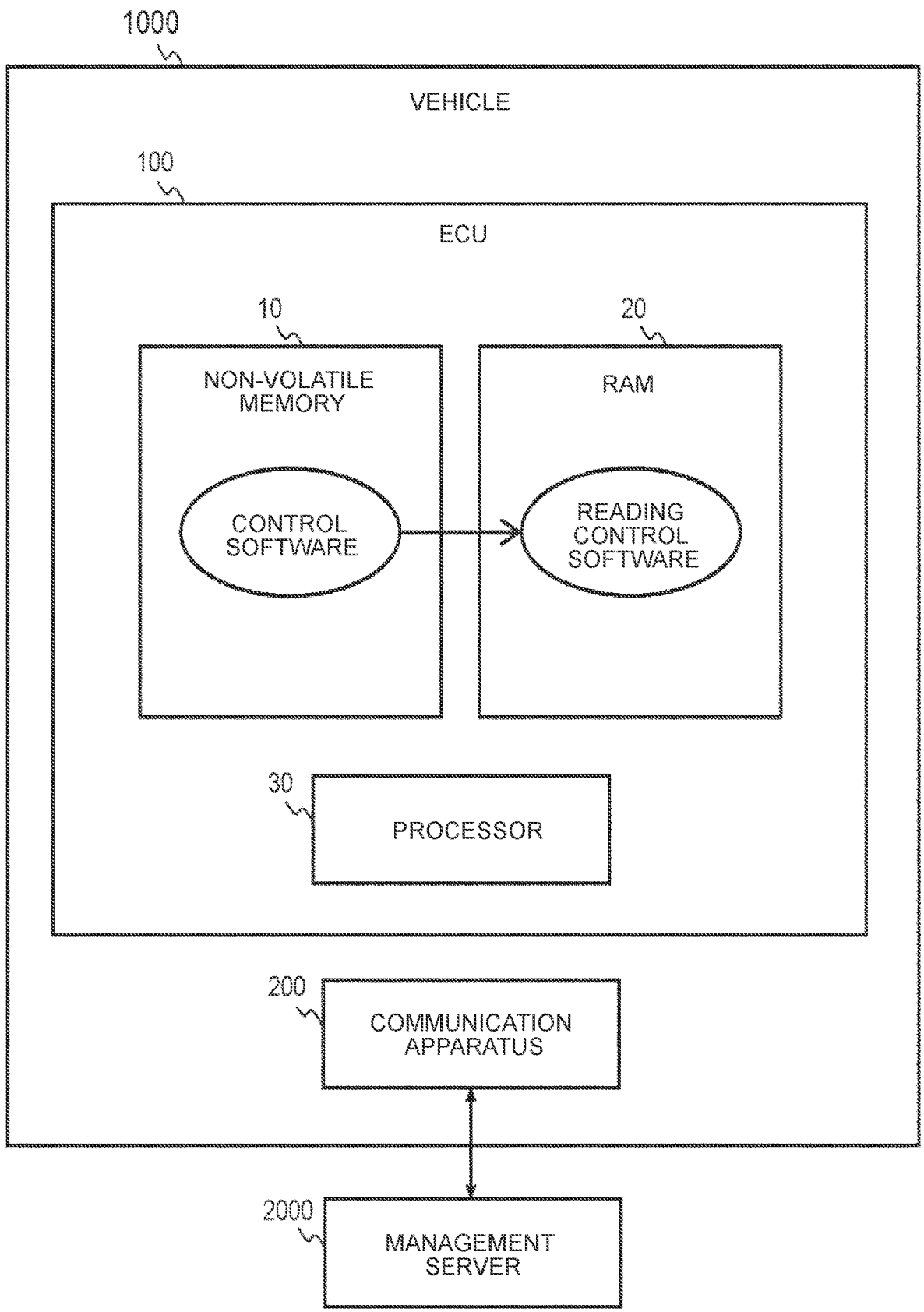
FIG. 1 is a block diagram for explaining a configuration example of a vehicle according to the present embodiment.

FIG. 1 illustrates a vehicle 1000 and a management server 2000. The management server 2000 is a server that performs management such as registration and distribution of software. The distribution of the software is performed by wireless communication or wired communication. When software is distributed by radio communication, the management server 2000 may be referred to as an Over the Air (OTA) server. Vehicle 1000 includes an ECU 100 and communication device 200. The vehicles 1000 may include other ECUs (not shown) in addition to ECU 100. The communication device 200 is configured to be capable of communicating with the outside of the vehicle 1000, and communicates with the management server 2000 when updating software, for example. ECU 100 includes a non-volatile memory 10, a Random Access Memory (RAM) 20, and a processor 30. The processor 30 may be a single processor or may be composed of a plurality of processors.

Software for controlling the vehicle 1000 is stored in the nonvolatile memory 10. The non-volatile memory 10 may store only one piece of software. The nonvolatile memory 10 can also store a plurality of pieces of software at the same time. When ECU 100 is activated, software (not shown) called boot software reads out software actually used for controlling the vehicles 1000 from the software stored in the nonvolatile memory 10 to RAM 20. Then, the processor 30 executes the read software to control the vehicle 1000. Reading the software into RAM 20 and causing the processor 30 to execute the software is referred to as starting up the software. Hereinafter, unless otherwise specified, the term "software" refers to software for controlling the vehicle 1000.

Software may be updated to new software for a variety of reasons, such as to add functionality, to eliminate failures, or to control a more comfortable vehicle. The software is updated by, for example, the management server 2000 distributing data via the communication device 200. Alternatively, it may be performed by writing from a computer outside the vehicle 1000. When the data is distributed from the management server 2000, the data of the new software is registered in the management server 2000 by the supplier of the software or the like. The management server 2000 distributes the data of the new software or the difference data between the pre-update software and the new software to the vehicle 1000. The distributed data is restored to the software in RAM 20 and stored in the non-volatile memory 10.

When the storage in the nonvolatile memory 10 is completed, the vehicle 1000 is controlled based on the new software. However, it may be necessary to return to the pre-update software after the update is completed. For example, when it is found that the software includes a defect. Software that contains a failure includes a case where a bug is found in the software, a case where the software does not operate normally, a case where the software does not actually cause a problem, and a case where the software may not operate normally.

For example, when the software of Ver5.0 stored in the nonvolatile memory 10 is updated to the software of Ver.6.0, it is assumed that it is found that the software of Ver6.0 includes a defect. Because there are few more new software that resolve the bugs contained in Ver6.0, they need to be returned to the pre-update Ver5.0 of software that is known to run normally.

In this way, returning the software used to control the vehicle to the software before the update is referred to as rollback. In the following explanation, the new software after the update is referred to as "software PROG", and the pre-update software to be rolled back is referred to as "old software PROG-OLD".

In a situation where rollback is required, the old software PROG-OLD is not always registered in the management server 2000. If there is no old software PROG-OLD that can be rolled back in the management server 2000, it is necessary to wait for the new software to be updated. Even if the old software PROG-OLD is registered in the management server 2000, rollback from the management server 2000 may not be performed depending on the communication status of the vehicle 1000.

Therefore, in the present embodiment, the rolling back is facilitated by mounting a non-volatile memory different from the non-volatile memory 10 in the vehicle 1000. In the following description, the non-volatile memory 10 is referred to as a "first non-volatile memory 10", and a non-volatile memory different from the non-volatile memory 10 is referred to as a "second non-volatile memory 40". The second nonvolatile memory 40 may be a memory incorporated in the vehicle 1000 or may be configured to be detachable from the vehicle 1000. Similarly to the first non-volatile memory 10, the second non-volatile memory 40 can also store software including the old software PROG-OLD.

When ECU 100 according to the present embodiment needs to return the software PROG stored in the first non-volatile memory 10 to the old software PROG-OLD, it determines whether or not the old software PROG-OLD is stored in the second non-volatile memory 40. If the old software PROG-OLD is stored in the second non-volatile memory 40, ECU 100 rolls back the old software PROG-OLD from the second non-volatile memory 40 to the first non-volatile memory 10. Accordingly, rollback can be performed quickly without relying on the management server 2000, and for example, even when it is discovered that a defect is included in the software PROG, it can be appropriately dealt with.

Figure 2:
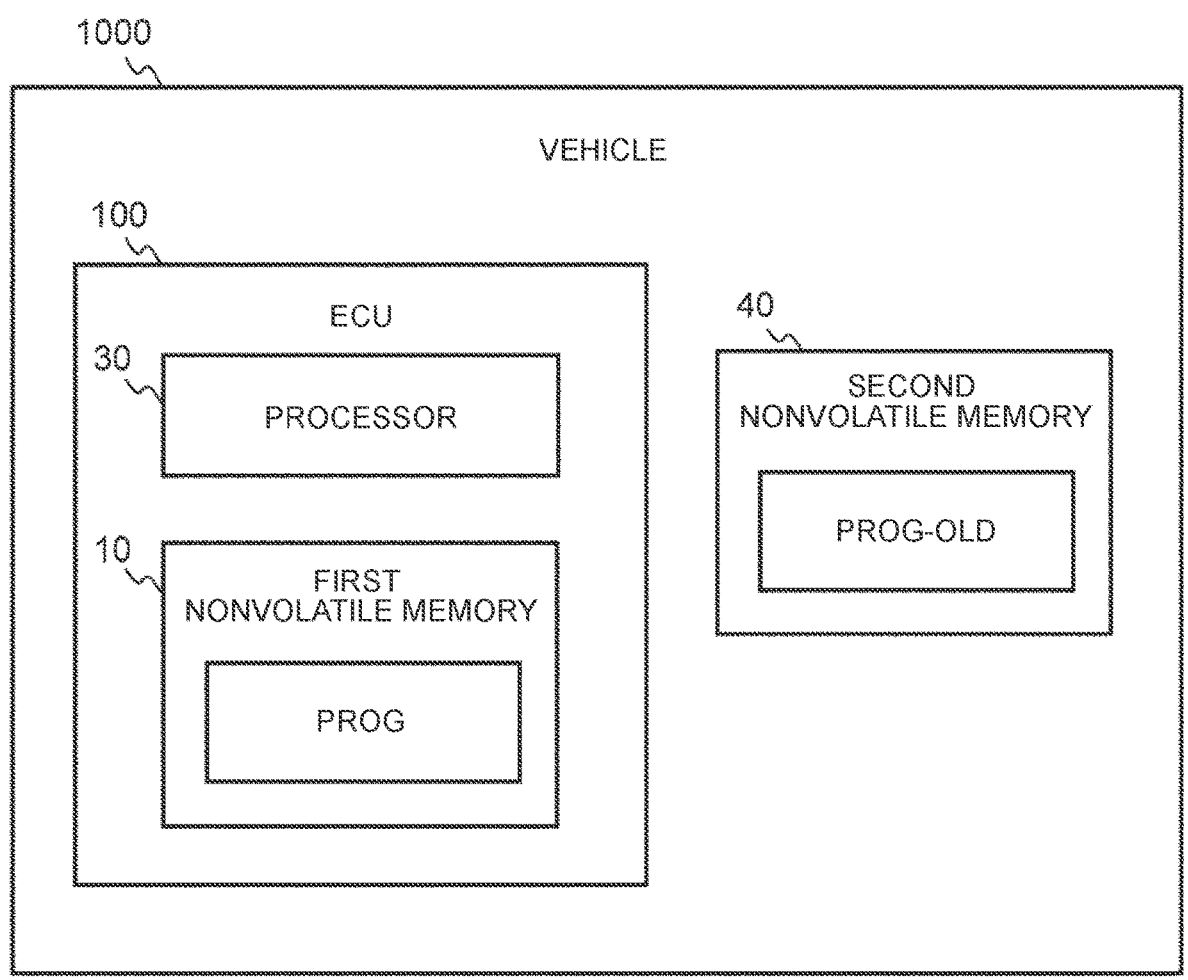
FIG. 2 is a block diagram showing a configuration example of a vehicle according to the present embodiment.
Figure 3:
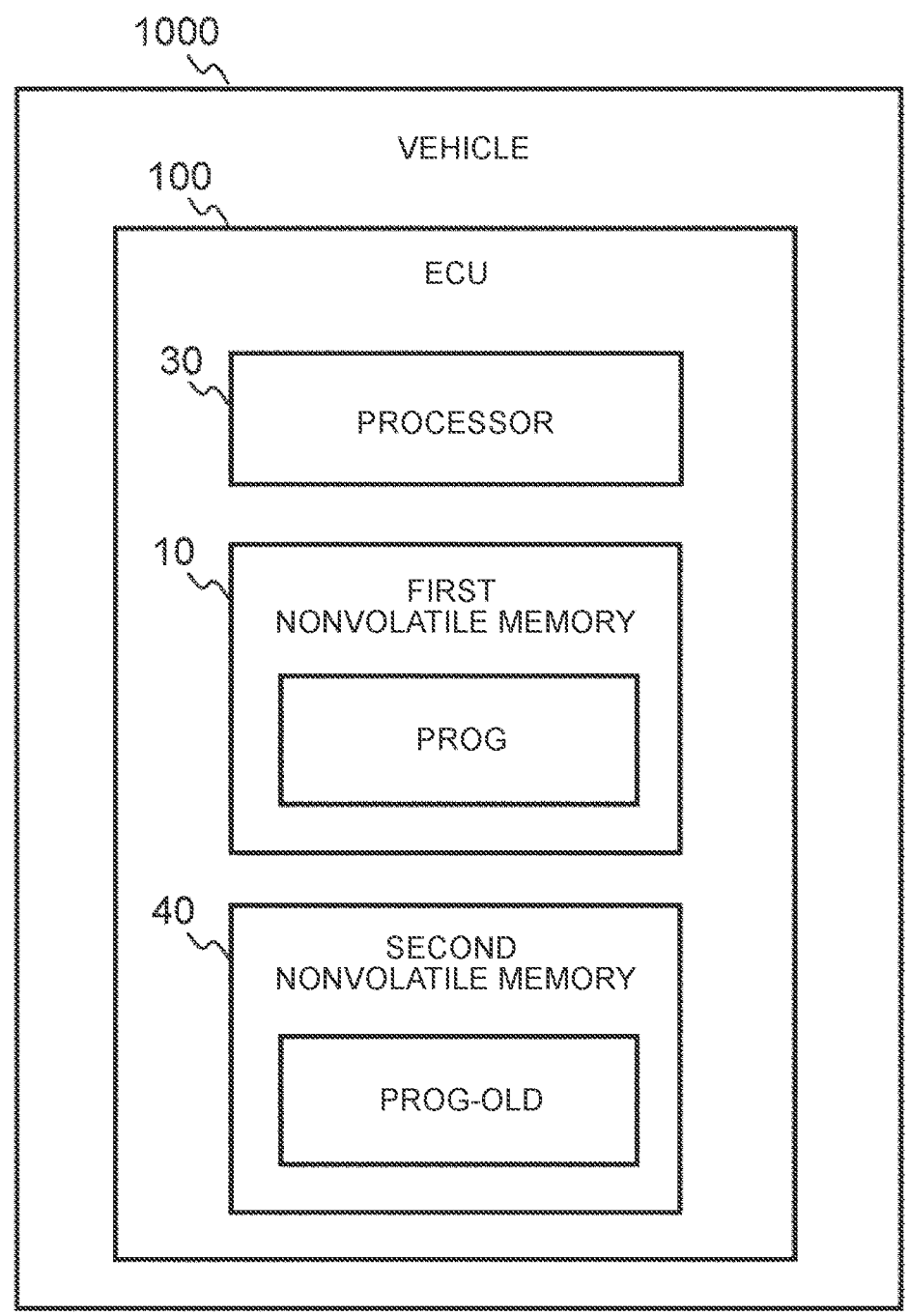
FIG. 3 is a block diagram showing another configuration example of a vehicle according to the present embodiment.

FIG. 2 and FIG. 3 show an example of a configuration of the vehicle 1000 including the second nonvolatile memory 40. In FIG. 2 and FIG. 3, RAM 20, the communication device 200, and the management server 2000 are omitted. In FIG. 2, the second nonvolatile memory 40 is mounted outside ECU 100. In FIG. 3, the second nonvolatile memories 40 are included in ECU 100.

In the present embodiment, the second nonvolatile memory 40 may be mounted anywhere inside the vehicle 1000. However, when the second non-volatile memory 40 is included in another ECU other than ECU 100, there is a possibility that the other ECU is affected by communication loads. Therefore, it is more desirable that the second non-volatile memories 40 be included in ECU 100 as shown in FIG. 3, or be mounted outside ECU 100 and other ECUs. The second nonvolatile memory 40 may be one or a plurality.

In FIG. 2 and FIG. 3, the first non-volatile memory 10 stores software PROG, and the second non-volatile memory 40 stores old software PROG-OLD. If the software PROG needs to be returned to the old software PROG-OLD, the processor 30 rolls back the old software PROG-OLD from the second non-volatile memory 40 to the first non-volatile memory 10. By performing rollback from the second non-volatile memory 40, the old software PROG-OLD can be rolled back quickly.

Various examples of processes related to rollback will be described below.

2. FIRST EXAMPLE

2-1.2 Surface Nonvolatile Memory

Figure 4A:
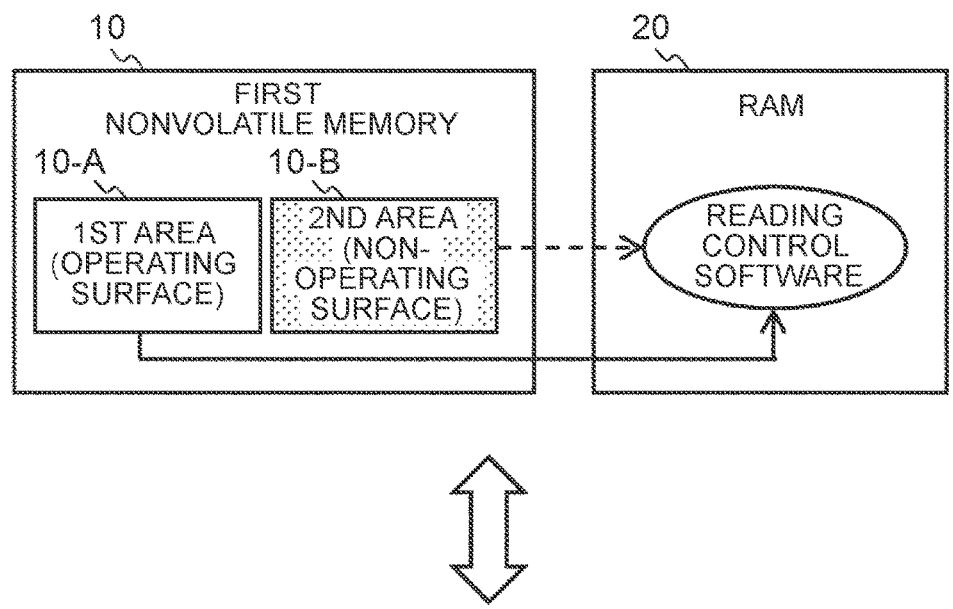
FIG. 4A is a conceptual diagram for describing an example of a first non-volatile memory according to the present embodiment.
Figure 4B:
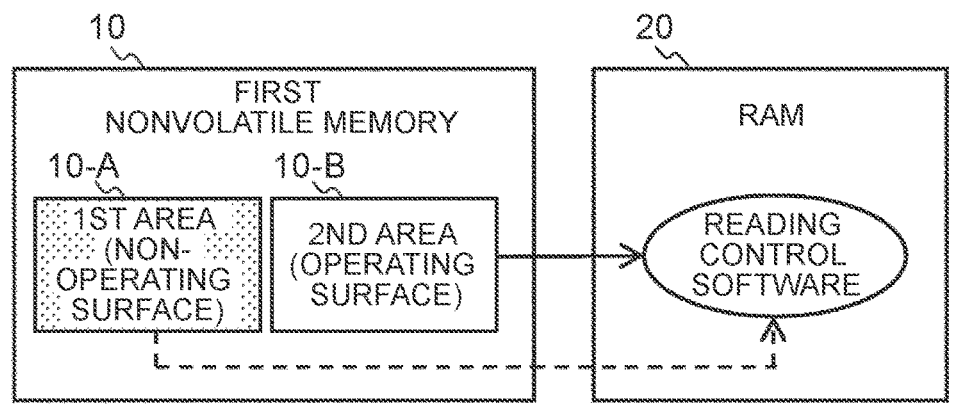
FIG. 4B is a conceptual diagram for describing an example of a first non-volatile memory according to the present embodiment.

In the first example, the first non-volatile memory 10 is a two-sided non-volatile memory. A two-sided non-volatile memory is a non-volatile memory having two regions in which software can be stored, and each region is sometimes referred to as a "surface". In FIGS. 4A and 4B, the two regions are illustrated as a first region 10-A and a second region 10-B. For example, the storage area of the software included in the first non-volatile memory 10 is divided into two areas 10-A, 10-B. Alternatively, the first non-volatile memory 10 may include two non-volatile memories, and the two non-volatile memories may function as the first area 10-A and the second area 10-B.

When the first non-volatile memory 10 has two regions, the booting software selects any one of the first region 10-A and the second region 10-B when ECU 100 is started. Of the software stored in the selected area, the software used for controlling the vehicle 1000 is activated. The selected area is referred to as an operation state area or an operation surface, and the non-selected area is referred to as a non-operation state area or a non-operation surface.

For example, in FIG. 4A, the first region 10-A is an operating surface, and the second region 10-B is a non-operating surface. In FIG. 4B, the operating surface and the non-operating surface are replaced, the first region 10-A is a non-operating surface, and the second region 10-B is an operating surface. Switching between the operating surface and the non-operating surface is referred to as switching of the operating surface.

By way of illustration, it is assumed that, in FIG. 4A and FIG. 4B, the software PROG of Ver2.5 is stored in the first area 10-A and the old software PROG-OLD of Ver2.0 is stored in the second area 10-B. The software executed by the processor 30 is a software PROG of Ver2.5 in FIG. 4A. The software executed by the processor 30 becomes the old software PROG-OLD of Ver2.0 when the operating surface is switched to FIG. 4B. The switching of the operating surface is performed while ECU 100 is stopped or immediately after ECU 100 is started.

Since the first non-volatile memory 10 has two regions, an operating surface and a non-operating surface, it is possible to write another software to the non-operating surface while executing the software stored in the operating surface. Since the software can be written without stopping the control, a smoother rollback is possible.

2-2. Example of Processing

FIGS. 5A to 5F are conceptual diagrams illustrating an example of a process related to rollback in the first example. In 5A to FIG. 5F, the software corresponding to the software PROG is Ver4.0 software, and the software corresponding to the old software PROG-OLD is Ver3.0 software. In the condition shown in 5A, the old software PROG-OLD of Ver3.0 stored in the second area 10-B of the operation surface is activated.

As shown in 5A, Ver4.0 software PROG is distributed from the management server 2000 and stored in the first non-volatile memory 10. At this time, Ver4.0 software PROG can be stored in both the first area 10-A and the second area 10-B. However, if the area to be stored is the first area 10-A that is a non-operating surface, the software PROG can be written without stopping the control, so that the software PROG can be updated more smoothly. In addition, the writing of the software PROG does not affect the old software PROG-OLD of the operational Ver3.0. When the writing of Ver4.0 software PROG to the first area 10-A of the non-operating surface is completed, the operating surface is switched. By switching the operation plane, the software to be started as shown in FIG. 5B becomes the software PROG of Ver4.0, and thus the updating is completed.

After the updating is completed, it may be backed up as shown in FIG. 5B. The backup is to save the old software PROG-OLD to the second nonvolatile memory 40. In other words, in FIG. 5B, the old software PROG-OLD of Ver3.0 stored on the non-operating surface is stored in the second nonvolatile memory 40 to perform backup. A more reliable rollback can be realized by the backup.

Thereafter, as shown in FIG. 5C, a new Ver5.0 of software may be distributed from the management server 2000. At this time, Ver5.0 software is stored in the second area 10-B on the non-operating side. When the writing of the software of Ver5.0 is completed, the operation plane is switched again, and the updating of the software of Ver5.0 is completed. However, in FIG. 5C and FIG. 5D, the status during the writing of the software is illustrated.

In FIG. 5D, it is discovered that a defect is included in the software PROG of Ver4.0, and it is required to return to the old software PROG-OLD. In FIG. 5B, since Ver3.0 old software PROG-OLD is stored in the second nonvolatile memory 40, the processor 30 performs rollback from the second nonvolatile memory 40. That is, the processor 30 stores the old software PROG-OLD of Ver3.0 in the second area 10-B of the non-operating surface as shown in FIG. 5E. At this time, even if the software of Ver5.0 is being written to the non-operating surface, rollback is prioritized and updating of the software of Ver5.0 is stopped.

After the storage, as shown in FIG. 5F, the operation plane is switched, and the software to be started becomes the old software PROG-OLD of Ver3.0, so that the rollback is completed. As shown in FIG. 5E, since the old software PROG-OLD is stored on the non-operating surface, the old software PROG-OLD can be written while controlling the vehicles 1000. As described above, since the first non-volatile memory 10 has two regions, it is possible to perform rollback more smoothly, and it is possible to appropriately deal with a defect related to software and the like.

Here, as a comparative example, a case where the second nonvolatile memory 40 is not provided will be considered. In such cases, Ver3.0 older software PROG-OLD cannot be used. This is because at least a part of the old software PROG-OLD of Ver3.0 stored in the second area 10-B is overwritten by the software of Ver5.0. On the other hand, according to the present embodiment, since the second nonvolatile memory 40 is provided, it is possible to return to Ver3.0 old software PROG-OLD by rollback. Further, by performing backup, rollback can be made more reliable. In this way, ECU 100 according to the present embodiment can take appropriate measures even when it is required to return to the old software PROG-OLD due to a defect related to software PROG or the like.

2-3. Rollback from a Non-Operational Aspect

As a modification of the present embodiment, when the old software PROG-OLD is stored in the non-operating surface, rollback from the non-operating surface may be performed.

Figure 6A:
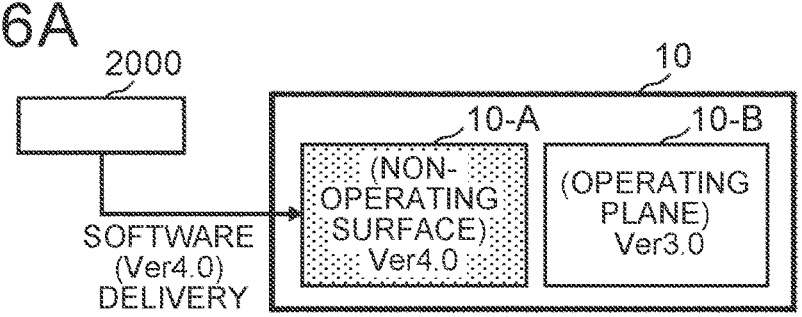
FIG. 6A is a conceptual diagram for explaining a first example of a process related to rollback according to the present embodiment.
Figure 6B:
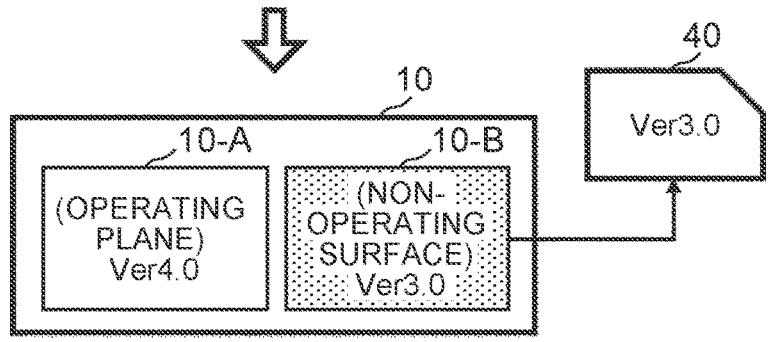
FIG. 6B is a conceptual diagram for explaining a first example of a process related to rollback according to the present embodiment.
Figure 6C:
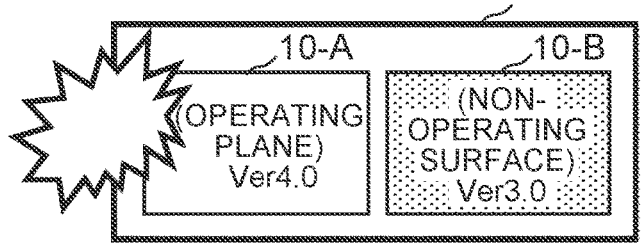
FIG. 6C is a conceptual diagram for explaining a first example of a process related to rollback according to the present embodiment.
Figure 6D:
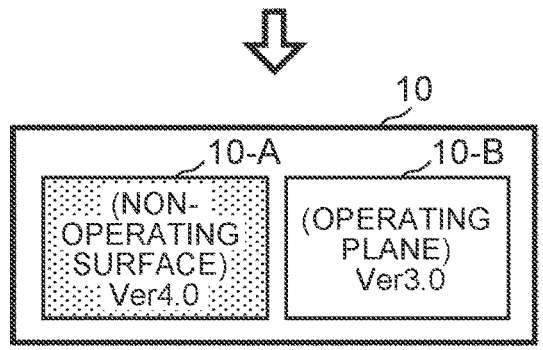
FIG. 6D is a conceptual diagram for explaining a first example of a process related to rollback according to the present embodiment.

FIGS. 6A through 6D illustrate exemplary rollbacks from a non-operational plane. In FIG. 6A to FIG. 6D, the software corresponding to the software PROG is the software of Ver4.0, and the software corresponding to the old software PROG-OLD is the software of Ver3.0. In FIG. 6A, as in FIG. 5A, the software PROG of Ver4.0 is distributed from the management server 2000 and stored in the non-operating surface of the first non-volatile memory 10. After the storage, the operation surface is switched. After the operation plane is switched, the old software PROG-OLD of Ver3.0 is backed up in FIG. 6B as in FIG. 5B.

(3) Ver4.0's software PROG is found to contain defects and must be returned to Ver3.0's old software PROG-OLD. At this time, Ver3.0 old software PROG-OLD is stored in the second area 10-B on the non-operating surface. Therefore, instead of performing rollback from the second nonvolatile memory 40, the operation plane is switched. By switching the operation plane, the software to be started becomes the old software PROG-OLD of Ver3.0 stored in the operation plane after the switching. That is, it is rolled back to the old software PROG-OLD.

The rollback caused by the switching of the operating surface is referred to as a rollback from the non-operating surface. In the rollback from the non-operating side, it is only necessary to switch the operating side, and it is not necessary to store the software again, so that the rollback can be performed more quickly.

2-4. Processing Flow

Figure 7:
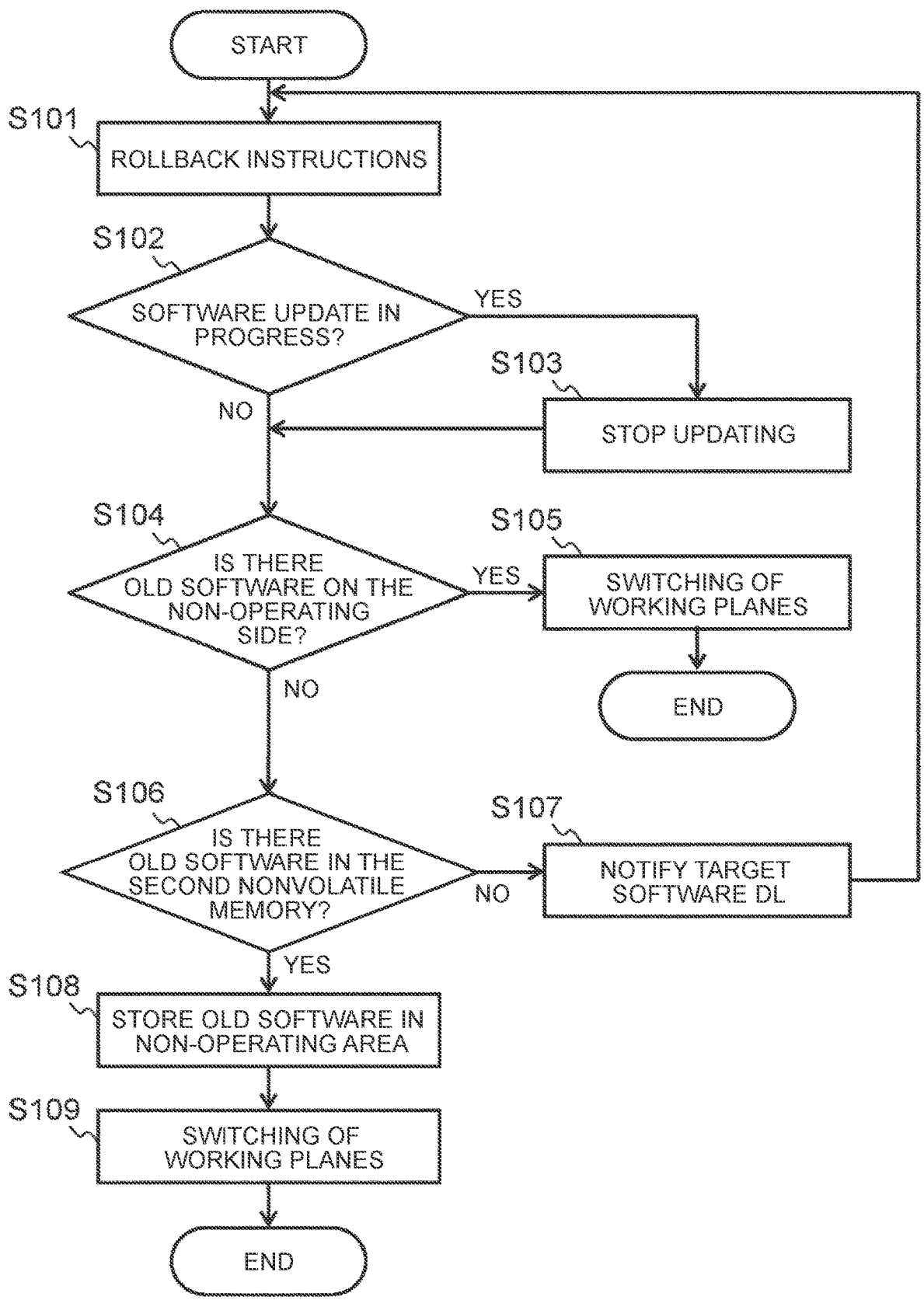
FIG. 7 is a flowchart showing a first example of a process related to rollback according to the present embodiment.

FIG. 7 is a flowchart illustrating a process related to rollback in the first example. The flowchart illustrated in FIG. 7 is executed by the processor 30.

In S101 of steps, a rollback instruction is issued to ECU 100. The rollback instruction is issued, for example, when the software needs to be returned to the old software PROG-OLD by the user of the management server 2000 or the vehicle 1000. When ECU 100 receives an indication of rollback, the process proceeds to step S102.

In S102, it is determined whether or not the software is being updated in the first non-volatile memory 10. If the software is being updated (step S102; Yes), the process proceeds to step S103. If not (step S102; No), the process proceeds to step S104.

In S103, the software-update is stopped to perform a rollback. Thereafter, the process proceeds to step S104.

In S104, it is determined whether or not the old software PROG-OLD is stored in the non-operating surface of the first non-volatile memory 10. At this time, it may be determined at the same time whether or not the old software PROG-OLD is in a state of maintaining integrity that is not altered or rewritten. If the old software PROG-OLD is stored with integrity (step S104; Yes), the process proceeds to step S105. If the old software PROG-OLD is not stored or the integrity of the old software PROG-OLD is not maintained (step S104; No), the process proceeds to step S106.

In S105, the operation plane is switched. Thereafter, the process ends. The switching of the operation plane performed in the step S105 is rollback from the non-operation plane.

In S106, it is determined whether the old software PROG-OLD is stored in the second non-volatile memory 40. At this time, it may be determined at the same time whether or not the old software PROG-OLD is in a state of maintaining integrity that is not altered or rewritten. If the old software PROG-OLD is stored with integrity (step S106; Yes), the process proceeds to step S108. If the old software PROG-OLD is not stored or the integrity of the old software PROG-OLD is not maintained (step S106; No), the process proceeds to step S107.

In S107, the processor 30 provides an external notification to download the required software. For example, the user of the vehicle 1000 is notified to perform a wired download using a dedicated tool or a download from an external computer. Thereafter, the process returns to the step S101.

In S108, the old software PROG-OLD is stored from the second non-volatile memory 40 to the non-operating surface of the first non-volatile memory 10. Thereafter, the process proceeds to step S109.

In S109 of steps, the operation plane is switched. The old software PROG-OLD is started by switching the operation planes. Thereafter, the process ends. The processes of S108 and the step S109 are rollback from the second non-volatile memory 40.

Figure 8:
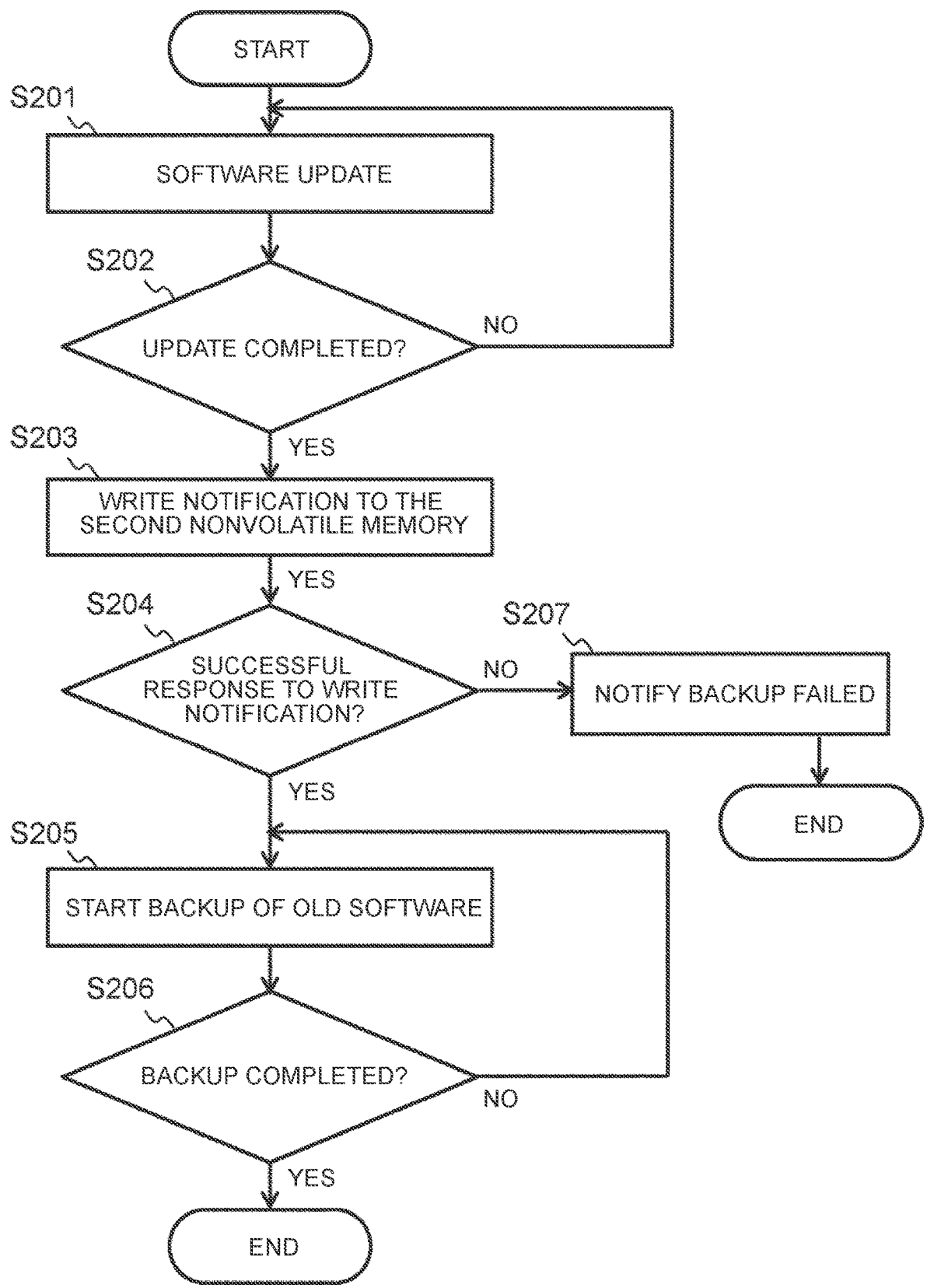
FIG. 8 is a flowchart showing an example of processing related to the backup according to the present embodiment.

Backing up the old software PROG-OLD is realized, for example, by the processor 30 executing the flow chart shown in FIG. 8.

In S201 of steps, the software is updated. When the software is updated, the process proceeds to step S202.

In S202 of steps, it is determined whether or not the software-updating is completed. For example, in a case where the software is updated by storing the new software in the non-operating surface of the first non-volatile memory 10, it is determined that the software is updated when the software is stored in the non-operating surface and the switching of the operating surface is completed. If the software has been updated (step S202; Yes), the process proceeds to step S203. If the updating is not completed (step S202; No), the process returns to step S201.

In S203, a software-write notification is sent to the second non-volatile memory 40. Thereafter, the process proceeds to step S204.

In S204, it is determined whether or not a normal response from the second non-volatile memory 40 has been received in response to the software-written notification. If there is a normal reply (step S204; Yes), the process proceeds to step S205. If there is no response or if the response is abnormal (step S204; No), the process proceeds to step S207. An abnormal response is generated when the second nonvolatile memory 40 fails or the capacity is insufficient.

In S207, the user of the vehicle 1000 is notified that the backup has failed. Thereafter, the process ends. By the notification of S207 of steps, it is possible to prompt the user to deal with a failure or a shortage of capacity of the second non-volatile memory 40.

In S205, the backup of the old software PROG-OLD, that is, the storage of the old software PROG-OLD in the second nonvolatile memory 40 starts. Thereafter, the process proceeds to step S206.

In the step S206, it is determined whether or not the back-up of the old software PROG-OLD has been completed. If backing up is not completed (step S206; No), the process returns to step S205. When the backup is completed (step S206; Yes), the backup process is stopped by the backup process control software, and the process ends.

3. SECOND EXAMPLE

In the second example, a step of performing authentication by the management center is added at the time of rollback from the second non-volatile memory 40. The second nonvolatile memory 40 is easier to rewrite than the first non-volatile memory 10, and is more susceptible to attack by a malicious third party. In addition, when a plurality of versions of software are stored in the second nonvolatile memory 40 as software of a version older than the software PROG, there is a possibility that the software may be rolled back to the wrong version. In the second instance, the step of authenticating is added to confirm that the old software PROG-OLD stored in the second non-volatile memory 40 is the correct version of the legitimate software. In this way, it is possible to prevent rollback to the falsified software or the wrong version of the software. The authentication step is performed as follows.

The management center assigns an encryption key corresponding to each version to the software. The management center may be the same as the management server 2000. When performing rollback from the second non-volatile memory 40, ECU 100 transmits the encryption key of the old software PROG-OLD to the managing center via the communication device 200. The administrative center decrypts the encryption key received from ECU 100 and verifies that it is legitimate software. For example, the uniqueness of the software is verified by authenticating using Hash given to the software. Alternatively, the authentication may be performed using a private key, a public key, a SHA-256, or the like. The old software PROG-OLD from the second non-volatile memory 40 is rolled back only when the administrative center authenticates correctly.

Figure 9:
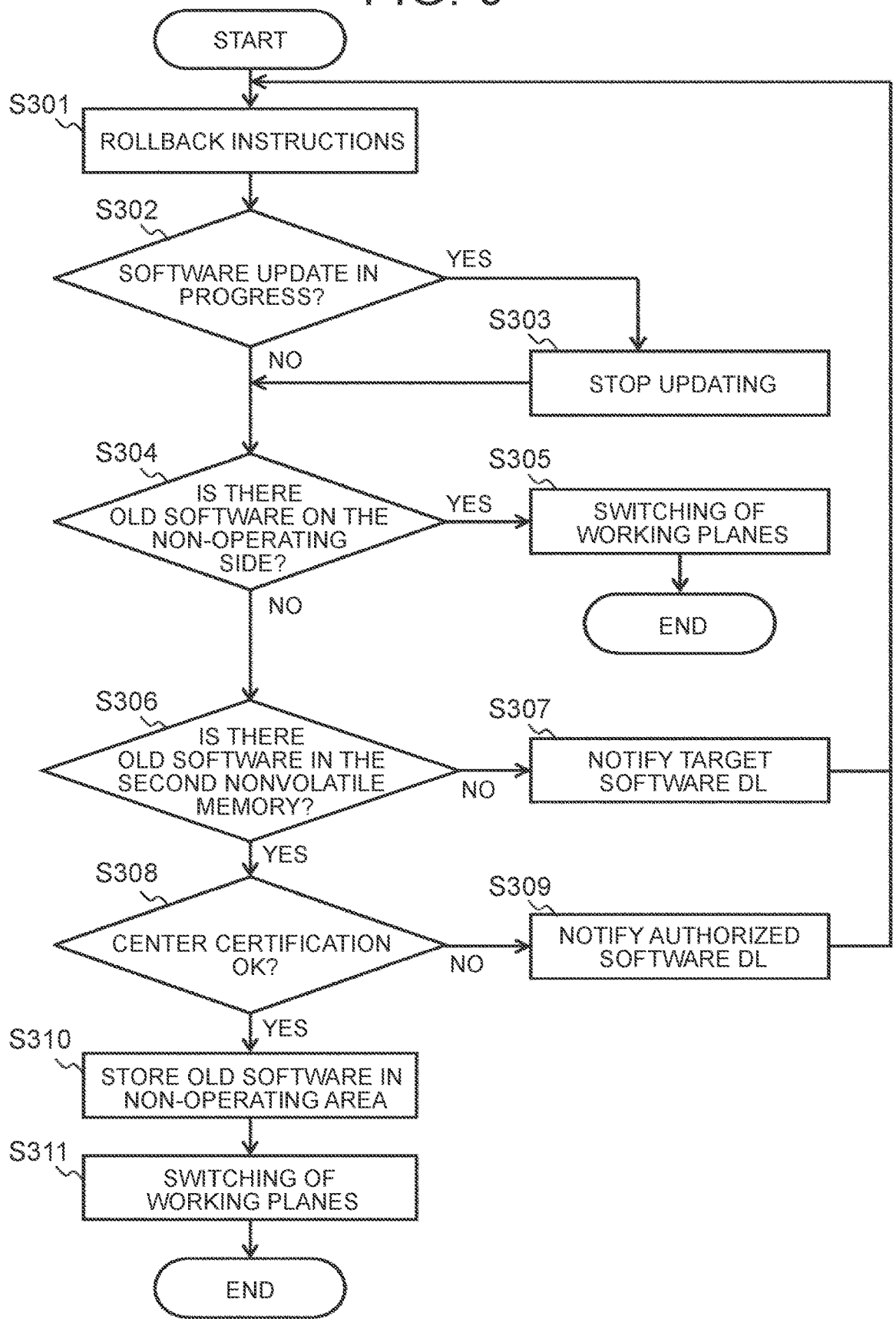
FIG. 9 is a flowchart illustrating a second example of a process related to rollback according to the present embodiment.

FIG. 9 is a flowchart illustrating a processing example in the second example.

In step S301 to step S307, the same process as in step S107 is performed from step S101 of FIG. 7. In step S306, if the software is stored (step S306; Yes), the process proceeds to step S308.

In S308, it is determined whether the old software PROG-OLD has been correctly authenticated by the administrative center. As described above, an encryption key is used for authentication by the management center. If it is correctly authenticated (step S308; Yes), the process proceeds to step S310. If it is not correctly authenticated (step S308; No), the process proceeds to step S309.

In step S309, the same process as in step S107 of FIG. 7 is performed. Thereafter, the process returns to the step S301.

In S310 and step S311, as in the step S108 and step S109 of FIG. 7, rollback of the old software PROG-OLD from the second non-volatile memory 40 is performed. After the operation plane is switched in the step S311, the process ends.

As described above, by adding the steps of authenticating the old software PROG-OLD by the administration center, it is possible to prevent the tampered software or the wrong version of the software from being rolled back to the first non-volatile memory 10. When the old software PROG-OLD that is correctly authenticated is not stored in the second non-volatile memory 40, a notification to the user is given, so that it is possible to prompt updating to the correct software.

3. THIRD EXAMPLE

The first non-volatile memory 10 may be a one-sided non-volatile memory. The control device according to the present embodiment can roll back and back up the old software PROG-OLD in the same manner as described above even when the first non-volatile memory 10 is a one-sided non-volatile memory. Hereinafter, an example of performing rollback and backup will be described.

In FIGS. 10A to 10D, the first non-volatile memory 10 has only one area 10-A as an area for storing software. Therefore, the area 10-A becomes the operating surface at all times. In FIG. 10A to FIG. 10D, the software corresponding to the software PROG is the software of Ver4.0, and the software corresponding to the old software PROG-OLD is the software of Ver3.0.

Figure 10A:
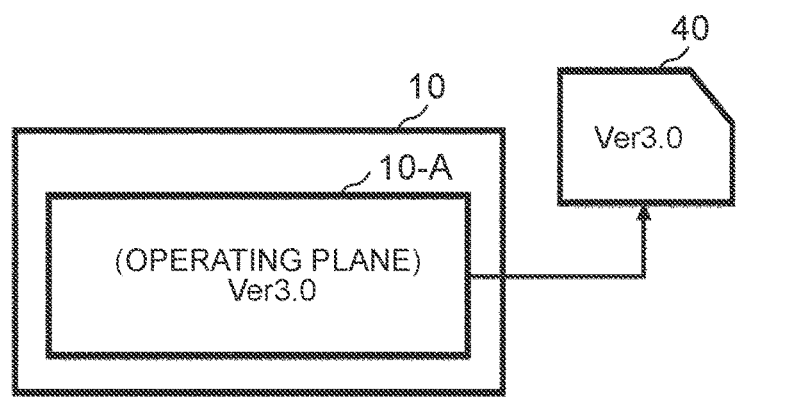
FIG. 10A is a conceptual diagram for explaining a third example of processing related to rollback according to the present embodiment.
Figure 10B:
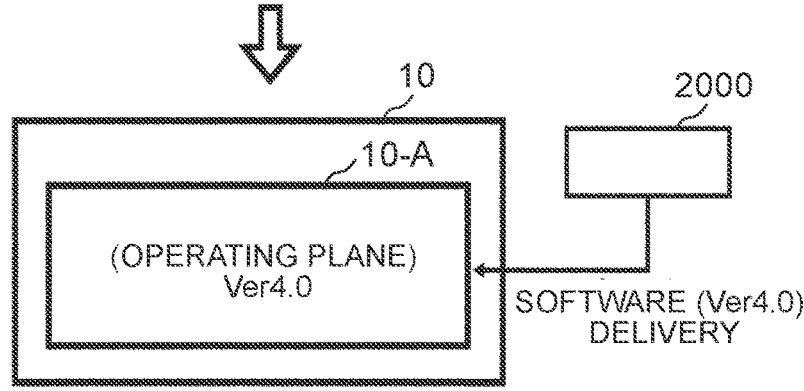
FIG. 10B is a conceptual diagram for explaining a third example of processing related to rollback according to the present embodiment.

In FIG. 10A, the area 10-A stores the old software PROG-OLD of Ver3.0. In FIG. 10A, the old software PROG-OLD is backed up, and the old software PROG-OLD of Ver3.0 is saved in the second nonvolatile memory 40. In FIG. 10B, Ver4.0 software PROG is distributed from the management server 2000, and the software of the first non-volatile memory 10 is updated to Ver4.0 software PROG. In FIG. 10B, the control system of the vehicle 1000 including ECU 100 is stopped while the software PROG is being updated.

Figure 10C:
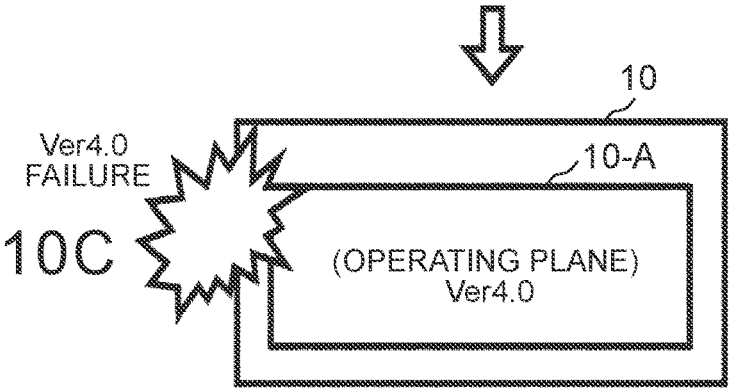
FIG. 10C is a conceptual diagram for explaining a third example of processing related to rollback according to the present embodiment.
Figure 10D:
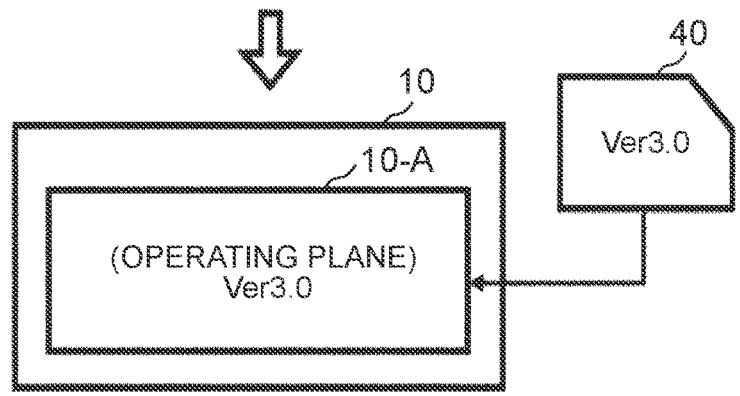
FIG. 10D is a conceptual diagram for explaining a third example of a process related to rollback according to the present embodiment.

After the updating is completed, it is discovered in FIG. 10C that the software PROG of Ver4.0 includes a defect, and it is required to return to the old software PROG-OLD. In view of this, rollback of the old software PROG-OLD of Ver3.0 is performed from the second nonvolatile memory 40 as shown in FIG. 10D. At this time, the control system of the vehicle 1000 is stopped until the rollback is completed.

As shown in FIGS. 10A to 10D, the control device according to the present embodiment can perform rollback regardless of whether the first non-volatile memory 10 is one side or two sides, and can appropriately deal with a problem even if it is found that the software includes a defect. In an ECU that does not require high performance such as a sensor ECU, the cost can be reduced by setting the area of the first non-volatile memory 10 to one.

4. OTHER EXAMPLES

The old software PROG-OLD may include two or more previous versions of software. For example, if a software discovers that it contains bugs, the previous version of the software may also contain similar bugs, and it may be necessary to return to the previous two or more versions of the software. In such cases, the control device according to the present embodiment may roll back to two or more previous versions of the old software PROG-OLD. In the present embodiment, data of an arbitrary version of software may be downloaded in advance from an external terminal such as a computer to the second non-volatile memory 40 so as to be able to roll back to an arbitrary version of software.

5. SUMMARY

As described above, by mounting the second nonvolatile memory 40 in the vehicle 1000, the control device according to the present embodiment can realize rapid rollback. By mounting the second nonvolatile memory 40, the free space of the memory can be reliably secured, and the old software PROG-OLD can also be backed up. In addition, since the second nonvolatile memory 40 can be configured to be removable, it is possible to select and use a memory of a variety of existing capacities, and it is possible to provide robustness to the system of the vehicle.

What is claimed is:

1. A control device for a vehicle, the control device comprising:
   a first non-volatile memory that stores software for controlling the vehicle; and
   one or more processors that execute the software, the one or more processors that execute the software are configured to:
   receive a request to return the software to an old version of the software;
   determine whether the software is being updated in the first non-volatile memory;
   upon determination that the software is not being updated in the first non-volatile memory;
      determine whether the old version of the software is stored in a non-operating surface of the first non-volatile memory;
      upon determination that the old version of the software is not stored in the non-operating surface of the first non-volatile memory:
         determine whether the old version of the software is stored in a second non-volatile memory;
         upon determination that the old version of the software is stored in the second non-volatile memory:
            move the old version of the software from the second non-volatile memory to the non-operating surface of the first non-volatile memory; and
            switch the non-operating surface of the first non-volatile memory to an operating surface.

2. The control device according to claim 1, wherein the second non-volatile memory is included in the control device, or the second non-volatile memory is mounted outside the control device and other control devices.

3. The control device according to claim 1, wherein:
   the first non-volatile memory includes a first area in which the software is stored and a second area different from the first area; and
   moving the old version of the software from the second non-volatile memory to the first non-volatile memory to store the old version of the software in the first non-volatile memory comprises:
      moving the old version of the software from the second non-volatile memory to the second area in a non-operating state to store the old version of the software in the second area in the non-operating state, and
      after the old version of the software is stored in the second area, switching the first area to a non-operating state and switching the second area to an operating state.

4. The control device according to claim 3, wherein
   the one or more processors further determine whether the old version of the software is stored in the second area of the first non-volatile memory when the software needs to be returned to the old version of the software before the update, and
   when the old version of the software is stored in the second area, the one or more processors switch the first area to the non-operating state, switch the second area to the operating state, and skip a determination as to whether the old version of the software before the update is stored in the second non-volatile memory mounted on the vehicle.

5. The control device according to claim 3, wherein the one or more processors further store the software in the first area in the non-operating state of the first non-volatile memory, switch the first area to the operating state and switch the second area to the non-operating state after the storing, and save the old version of the software in the second non-volatile memory after the switching, at a time of the update from the old version of the software to the software.

6. The control device according to claim 1, wherein the one or more processors further save the old version of the software in the second non-volatile memory and store the software in the first non-volatile memory at a time of the update from the old version of the software to the software.

7. The control device according to claim 1, wherein the one or more processors are further configured to receive the request to return the software to the old version of the software after a software update to a new version of the software from the old version of the software is successfully completed.

8. The control device according to claim 1, wherein the one or more processors are further configured to:
   determine whether the software is being updated to a new version of the software in the first non-volatile memory;
   upon determination that the software is being updated to the new version of the software in the first non-volatile memory:
      stop the software update to the new version, and then determine whether the old version of the software is stored in the non-operating surface of the first non-volatile memory; and
   upon determination that the software is not being updated to the new version of the software in the first non-volatile memory, determine whether the old version of the software is stored in the non-operating surface of the first non-volatile memory.

9. A method for managing a control device mounted on a vehicle and including a first non-volatile memory that stores software for controlling the vehicle, the method comprising:
   receiving a request to return the software to an old version of the software;
   determining whether the software is being updated in the first non-volatile memory;
   upon determination that the software is not being updated in the first non-volatile memory:
      determining whether the old version of the software is stored in a non-operating surface of the first non-volatile memory;
      upon determination that the old version of the software is not stored in the non-operating surface of the first non-volatile memory:
         determining whether the old version of the software is stored in a second non-volatile memory;
         upon determination that the old version of the software is stored in the second non-volatile memory:
            moving the old version of the software from the second non-volatile memory to the non-operating surface of the first non-volatile memory; and
            switching the non-operating surface of the first non-volatile memory to an operating surface.

10. The method according to claim 9 further comprising:
receiving the request to return the software to the old version of the software after a software update to a new version of the software from the old version of the software is successfully completed.

11. The method according to claim 9 further comprising:
determining whether the software is being updated to a new version of the software in the first non-volatile memory;
upon determination that the software is being updated to the new version of the software in the first non-volatile memory:
  stopping the software update to the new version, and then determine whether the old version of the software is stored in the non-operating surface of the first non-volatile memory; and
upon determination that the software is not being updated to the new version of the software in the first non-volatile memory, determining whether the old version of the software is stored in the non-operating surface of the first non-volatile memory.

\* \* \* \* \*